United States Patent [19]

Thomas

[11] Patent Number: 4,845,858
[45] Date of Patent: Jul. 11, 1989

[54] STUD LOCATING TAPE

[76] Inventor: Ronald K. Thomas, 1850 U.S. Hwy. 27 South, Avon Park, Fla. 33825

[21] Appl. No.: 67,485

[22] Filed: Jun. 29, 1987

[51] Int. Cl.$^4$ ................................................. G01B 3/10
[52] U.S. Cl. ....................................... 33/759; 33/403; 33/494; 33/197
[58] Field of Search ...................... 33/137 R, 138, 563, 33/562, 199, 403, 494, 520

[56] References Cited

U.S. PATENT DOCUMENTS

| | | | |
|---|---|---|---|
| 2,187,087 | 1/1940 | Leary | 33/194 X |
| 2,563,674 | 8/1951 | Coots | 33/403 |
| 3,136,067 | 6/1964 | Horner | 33/137 R |
| 4,152,836 | 5/1979 | Rodrique | 33/494 |
| 4,301,596 | 11/1981 | Sedlock | 33/137 R |
| 4,679,323 | 7/1987 | Sweatman | 33/138 |

Primary Examiner—William D. Martin, Jr.
Attorney, Agent, or Firm—Warren D. Flackbert

[57] ABSTRACT

In connection with building stud layout, a continuous rollable tape, selectively and adhesively secured to the bottom and top plates of a wall installation, for positively establishing stud locations by providing a series of indicia portions, where like indicia portions represent the same on center stud distance, as, for example, 16", 24" and/or 48". Provision is made for accommodating the use of siding or sheeting of various thicknesses and still maintaining the stud centering at the desired distance. No measurement is required nor is guesswork involved by the stud installer.

4 Claims, 1 Drawing Sheet

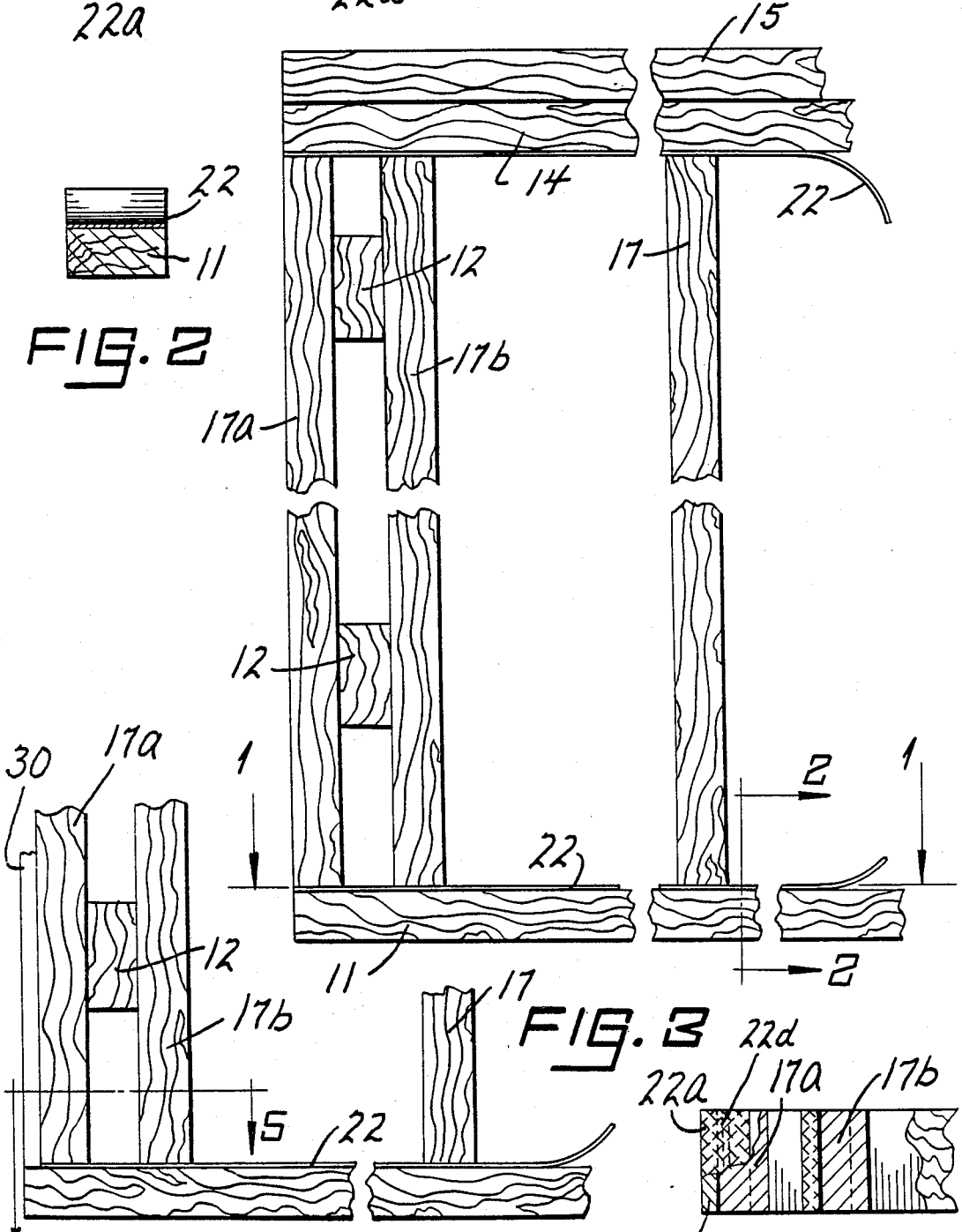

STUD LOCATING TAPE

As is known, and with the increased building of residences, offices and the like, saving of construction time represents a lesser cost to the owner/builder and, therefore, is of significant importance. In this connection, the use of commonly known studs, as for walls, for example, requires accuracy in placement between the top and the bottom plates, where, typically, the erected walls are then covered with conventional drywall material.

In any event, the invention provides a stud layout tape which, when positioned for use, assures accuracy in stud placement, whether the studs are at 16", 24" and/or 48" centers, and where accommodation is also made for outside sheeting. Broadly, the preceding is accomplished through the use of a masking type tape base, adhesively secured to the upper surface of the bottom plate and the lower surface of the top plate, for example, and color or otherwise coded to assure positive stud positioning at each desired preselected stud location.

A better understanding of the present invention will become more apparent from the following description, taken in conjunction with the accompanying drawing, wherein

DESCRIPTION OF THE FIGURES

FIG. 1 is a top plan view, partly fragmentary, showing a stud layout tape in accordance with the teachings of the present invention, such being taken at line 1—1 on FIG. 3 and looking in the direction of the arrows;

FIG. 2 is a view in vertical section of the instant stud layout tape, taken at line 2—2 on FIG. 3 and looking in the direction of the arrows;

FIG. 3 is a view in elevation showing a wall assembly utilizing the stud layout tape of the invention;

FIG. 4 is another view in side elevation, but in this instance illustrating the usage of the stud layout tape in connection with sheeting which defines an outside wall; and, FIG. 5 is a view in horizontal section, detailing the arrangement of FIG. 4, being taken at line 5—5 on such figure and looking in the direction of the arrows.

For the purposes of promoting an understanding of the principles of the invention, reference will now be made to the embodiment illustrated in the drawing and specific language will be used to describe the same. It will nevertheless be understood that no limitations of the scope of the invention is thereby intended, such alterations and further modifications in the illustrated device, and such further applications of the principles of the invention as illustrated therein being contemplated as would normally occur to one skilled in the art to which the invention relates.

Referring now to the figures, and particularly FIGS. 1, 2 and 3, a typical arrangement is disclosed which employs stud layout tape 22 of the invention. In this connection, such an installation includes a bottom plate 11, a top plate 14 overlaid by another plate 15, and a series of studs 17 interconnecting and fastened to the bottom plate 11 and the top plate 14. In the instance of a conventional wall, spacers 12 are provided between end stud 17a and next adjacent stud 17b.

In any event, the instant stud layout tape 22 is, typically, in the form of a commercially available rollable masking type tape base, perhaps in $1\frac{1}{2}$", 3" and 5" widths, and adhesively secured to the upper surface of the bottom plate 11 and the lower surface of the top plate 14. In other words, and prior to stud assembly, the stud layout tape 22 is positioned, meaning assurance of stud placement throughout the length of any given wall.

The stud layout tape 22 itself presents colored indicia portions 22a-22b-22c, being representative, for example, of 16", 24" and 48" stud 17 centers. In this connection, indicia portions 22a, presented in the same color, illustrate the end stud 17a, a spacer area, and the next adjacent stud 17b location. Thereafter, the same colored indicia portion 22a, on 16" centers from the end stud 17a, is evident on the layout tape 22, with the preceding pattern extending the entire length of the layout tape 22.

In other words, each stud 17, aligned with the same colored indicia portion 22a appearing on the layout tape 22 on the upper surface of the bottom plate 11 and the lower surface of the top plate 14, achieves positive assembly on 16" centers.

The same result is true in connection with colored indicia portions 22b which illustrate, in a different color, 24" stud 17 centers. In other words, after the end stud 17a is positioned (together with the spacers 12 and the next adjacent stud 17b), a colored indicia portion 22b locates another stud 17 for positive 24" on center placement and, thereafter, each succeeding stud 17 (at the same colored indicia portion 22b).

As a matter of mathematics, at a 48" stud 17 center location, i.e. from the end stud 17a, the layout tape 22 would present a mixed colored portion 22c (the combined colors of indicia portions 22a-22b), i.e. $3 \times 16$" (or 48") is equivalent to $2 \times 24$" (or 48").

With reference now to FIGS. 4 and 5, where the end stud 17a supports outer sheeting 30, lines 22d inscribed on the layout tape 22 indicate, for example, the sheeting 30 thickness or depth, as $\frac{1}{2}$", $\frac{3}{4}$" or 1". The outer edge of the end stud 17a is postioned at the appropriate line 22d. Thereafter, the aforesaid spacers 12 are placed, as is the next adjacent stud 17b, and then the remaining studs 17 placed in accordance with the appropriate colored indicia portions.

The layout tape 22 accommodates the sheeting 30 thickness and the existing colored indicia portions 22a-22b-22c are automatically representative of 16", 24" and 48" centers, even though the outer edge of the end stud 17a is not at the end of the layout tape 22 nor at the end of the bottom plate 11 or the top plate 14. Thus, stud 17 center placement is positively assured by using comparably colored portions presented on the applied layout tapes 22.

It should be evident, therefore, that the stud layout tape presented herein is readily applied for usage and, as well, achieves versatility and positive stud placement. The tape serves both inner wall and outer wall stud installation usages, where it is merely a responsibility of the user to match the same colored or otherwise identified/coded indicia portions to assure correct stud assembly. Obviously, no measurement is required nor any guesswork involved by the installer.

The stud layout tape described hereabove is, of course, susceptible to various changes within the spirit of the invention, including, by way of example, the material from which the tape is fabricated; the precise configuration of the indicia portions, such as the use of other than colored areas, as, for example, line groupings, star outlines or the like; the manner of affixing the layout tape to the plates; and, the like. Thus, the preceding should be considered illustrative and not as limiting the scope of the following claims:

I claim:

1. A stud locating tape comprising a continuous rollable strip presenting multiple series of indicia portions beginning at the same location thereon, where said indicia portions in each series are spaced at different preselected equal and repeating intervals therealong and represent a stud location area, where said indicia portions representative of the same preselected intervals have the same appearance, and where the indicia portion located at the beginning of said multiple series of indicia portions includes means accommodating differences in sheeting thickness defined as spaced-apart parallel lines within said indicia portion disposed laterally with respect to the longitudinal axis of said continuous rollable strip.

2. The stud locating tape of claim 1 where said indicia portions are ornamental areas.

3. The stud locating tape of claim 1 where said indicia portions are colored areas.

4. The stud locating tape of claim 1 where said continuous rollable strip is disposed on a first plate and another continuous rollable strip is disposed on a spaced apart generally parallel second plate, and where a stud extends between correspondingly disposed indicia portions on said continuous rollable strip and on said another continuous rollable strip.

* * * * *